R. K. BOYLE.
ELECTRIC TELEGRAPH.

No. 169,513.                    Patented Nov. 2, 1875.

Witnesses.
Chas. Wahlers.
Otto Hufeland.

Inventor.
Robert K. Boyle
pr
Van Santvoord & Hauff
Attrs

UNITED STATES PATENT OFFICE.

ROBERT K. BOYLE, OF NEW YORK, N. Y.

IMPROVEMENT IN ELECTRIC TELEGRAPHS.

Specification forming part of Letters Patent No. 169,513, dated November 2, 1875; application filed March 30, 1875.

*To all whom it may concern:*

Figure 1:
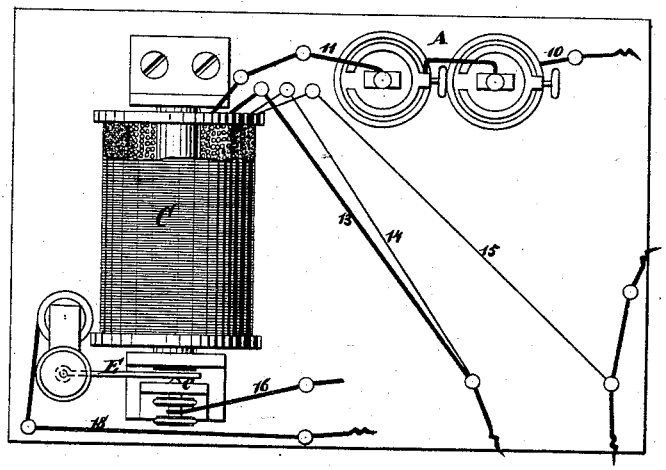
Figure 2:
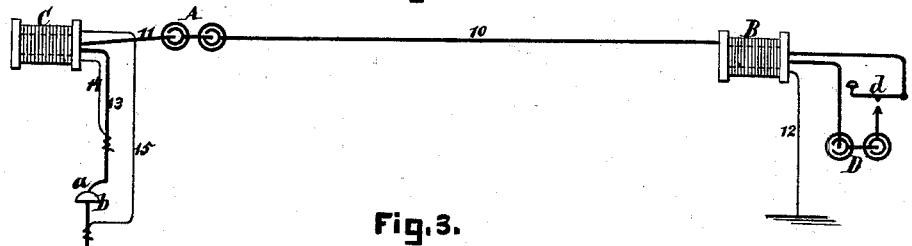
Figure 3:
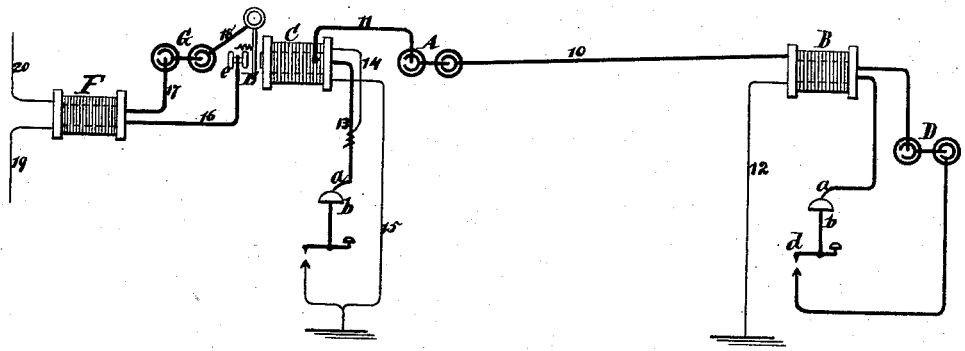

Be it known that I, ROBERT K. BOYLE, of the city, county, and State of New York, have invented a certain new and useful Improvement in Electric Telegraphs, of which the following is a specification:

This invention is illustrated in the accompanying drawing, in which Figure 1 represents a plan or top view of my apparatus. Figs. 2 and 3 are diagrams showing different ways of applying my apparatus in a telegraph-line.

Similar letters indicate corresponding parts.

This invention relates to that class of electric telegraphs in which induced currents are used in addition to battery-currents, and which are intended particularly for chemical writing.

My improvement consists in combining, with a battery in the line of a telegraph, two induction-coils, one in each terminus of the line, the battery being always closed on the line, in such a manner that if the connections are made with a chemical-writing instrument a continuous line will be drawn on the paper by the action of the line-battery current as long as the paper is drawn through under the pen, and whenever the local battery in the transmitting-station is closed and opened, which is done whenever a signal is to be transmitted, two induced currents of different potentials pass over the line to the receiving-instrument. One of these currents, having the same potential as the line-battery current, increases the force of this battery, and the line drawn by the pen of the writing-instrument becomes more distinct, while the second induced current, which is of opposite potential from the line-battery current, neutralizes this current, and the pen of the writing-instrument ceases to produce any mark on the paper, and consequently the recording of signals is effected by clear spaces between the line drawn by the pen. The helices of the induction-coil in the receiving-station are so connected with the recording pen and instrument that its currents will act in conjunction with and increase the force of the currents of the main line. With the receiving induction-coil is combined an armature, which opens and closes a local battery in the receiving-stations, connected to an induction-coil and to a line-wire extending to another station.

In the drawing, the letter A designates a battery, which throws a continuous current in the line-wire, one pole of said battery being connected by the wire 10 with an induction-coil, B, at one terminus of the line, while the other pole of said battery connects by a wire, 11, with an induction-coil, C, at the other terminus of the line. (See Figs. 2 and 3.) The wire 10 connects with one end of the secondary helix of the coil B, the other end of said secondary helix being connected by a wire, 12, with the ground. The wire 11 connects with one end of the primary helix of the coil C, the other end of which connects by a wire, 13, with the pen $a$ of a chemical-writing instrument, and, through this pen and the support $b$ of the chemically-prepared paper $c$, with the ground. By this connection the line-battery current passes constantly through the paper, and, if the paper is moved along beneath the pen, a continuous line is produced on it. The ends of the primary helix of the coil B connect with a local battery, D, a key, $d$, being inserted into this connection for the purpose of giving signals. When the key is depressed and the circuit through the primary helix of the coil B is closed, a current is induced in the secondary helix of the coil B, and the connection is so made that this induced current is of the same potential as that of the line-battery current, and consequently the effect of this last-named current will be increased, and the distinctness of the line produced by the pen $a$ on the strip of paper will be momentarily improved. When the circuit of the local battery D is opened a current of the opposite potential will be induced in the secondary helix of the coil B, the power of the line-battery current is momentarily neutralized, and the pen ceases to produce a mark on the strip of paper moving beneath it. The secondary helix of the coil C in the receiving-station connects at one end, by wire 14, with the pen $a$, and at its opposite end, by wire 15, with the ground, and this connection is so made that the current induced in this secondary helix by the line-battery current will strengthen this current when the pen $a$ is to produce a line on the strip of paper, and that it will counteract the line-battery current when the pen is to stop marking. It will be seen that by this arrangement the signals sent over the line-wire are recorded by interruptions or blank spaces left in the line drawn by the pen on the strip of paper. The induction-coil C is provided with a vibrating armature, E, which, when drawn back by its spring, bears against a spring, e, Figs. 1 and 3, that connects by wire 16 with one end of the primary helix of an induction-coil, F. The other end of this primary helix connects by a wire, 17, with one pole of a local battery, G, the other pole of which is in metallic connection, by a wire, 18, with the armature E. When signals are sent over the line-wire 10, Fig. 3, the armature E is alternately attracted by and drawn back from the core of the induction-coil C, and corresponding currents are induced in the secondary helix of the coil F. One end of this secondary helix connects by a wire, 19, with the ground, while its other end connects, by a wire, 20, with a second station. The connection of the wire 20 will be the same as that of wire 10, and the signals transmitted over this last-named wire and recorded in the first station will pass on and be recorded in the second station. It will be readily seen that the line can thus be extended to any desired number of stations.

With suitable changes, my apparatus can also be used for other telegraph-instruments besides a chemical-writer.

By using a continuous induced current of one potential on the line, the line-battery current can be always neutralized and allowed to act only when a signal is given—that is to say, when the induced current is opened—and in this case the pen of the writing-instrument will only mark the signals in the usual manner.

What I claim as new, and desire to secure by Letters Patent, is—

1. In a telegraphic apparatus, the combination of two induction-coils, one in each terminus of the line, with a battery in the line of the telegraph, the current of said battery being closed continually over the line-wire, and being made to act on the pen or stylus of a chemical-writing instrument, while its force is alternately increased and then neutralized by the currents induced in the induction-coils, whereby signals are recorded by breaks in the line drawn in the paper moving under the pen or stylus, as shown and described.

2. The combination, in a telegraphic apparatus, of induction-coils B C, line-battery A, circuit-breaking armature E, local battery G, and induction-coil F, substantially as and for the purpose set forth.

In testimony that I claim the foregoing I have hereunto set my hand and seal this 27th day of March, 1875.

R. K. BOYLE. [L. S.]

Witnesses:
W. HAUFF,
E. F. KASTENHUBER.